Aug. 23, 1960    J. B. THOMSON    2,950,149
RELATIVELY RECIPROCABLE SHAFT AND BEARING
Filed Jan. 29, 1957

INVENTOR.
JOHN B. THOMSON
BY
ATTORNEYS.

United States Patent Office 2,950,149
Patented Aug. 23, 1960

2,950,149
RELATIVELY RECIPROCABLE SHAFT AND BEARING

John B. Thomson, 1029 Plandome Road, Manhasset, N.Y.

Filed Jan. 29, 1957, Ser. No. 636,897

2 Claims. (Cl. 308—4)

The present invention has for its object the provision of a novel and improved shaft and bearing for relative reciprocation.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
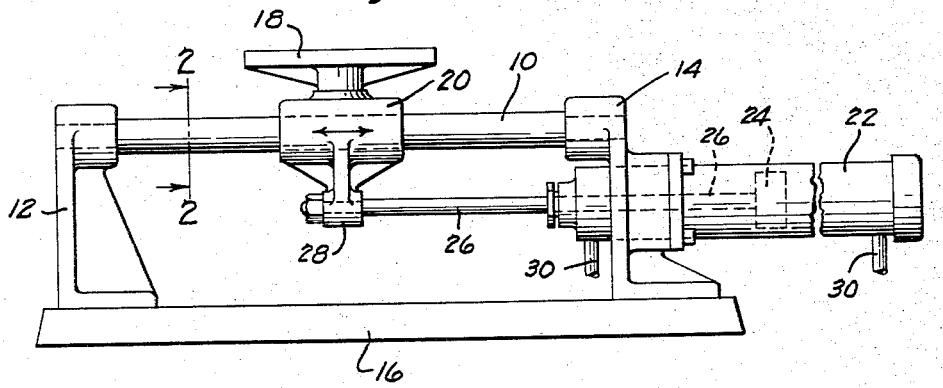
Figure 2:
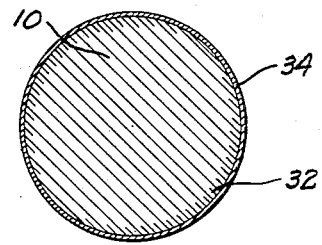

Of the drawings:

Figure 1 is a side elevation of a typical and illustrative embodiment of the present invention in its preferred form, and showing one of the many ways in which the principles of the present invention may be practiced and its advantages realized; and Figure 2 is a cross section taken on the line 2—2 of Figure 1.

The present invention has for its object the provision of a novel and improved combination of a shaft and bearing for reciprocation which has a longer life, is more economical in construction and presents numerous advantages over conventional constructions. A further object is the provision of a shaft and sleeve bearing combination in which the shaft is provided over its entire frictional area with a surface of a relatively good bearing material adherent on the main body of the shaft which is formed of metal having the desired good structural properties, while the sleeve bearing in which the shaft reciprocates is formed from a relatively hard, wear-resisting material, whereby the wear on the frictional surfaces is substantially concentrated on the relatively large surface of the shaft, with a corresponding increase in the useful life of the combination. The invention further provides an improved bearing and shaft for relative reciprocation which has improved durability and is especially adapted for use under moist or humid conditions.

In general, the machine element of the present invention comprises a relatively long and preferably straight shaft member formed of a structural metal, such as steel which may be hardened and has the desired good compressive and tensile strength properties and which is provided, as by dipping, electroplating or spraying with a relatively thin, substantially uniform surface of a bearing material which is preferably selected from the group of metallic bearing alloys consisting of the copper-, lead-, tin- and aluminium-based bearing alloys and is worked to form a porous, lubricant-retentive bearing metal of a substantially uniform outer-diameter, as by grinding, broaching or other machining operation. Best results are obtained where a steel shaft of good quality steel is hardened to the desired hardness, is straightened and then sprayed with a very thin coating of a bonding metal, such as molybdenum, after which the shaft is sprayed with a thin, substantially uniform layer of a copper-based, brass or bronze, bearing metal to provide a layer of porous, lubricant-retentive bearing metal securely bonded to the surface of the shaft. The bearing surface of the shaft is then machined, as by broaching, turning or grinding, to render it substantially uniform in diameter and straight, thereby preparing the shaft for use in the present invention.

The sleeve bearing of the combination of the present invention is preferably formed, at least on its surface, from a relatively hard metal, considerably harder than the surface of the bearing metal with which the shaft is coated, and is accurately finished on its interior to a cylindrical shape providing proper running clearance with the shaft which is to be relatively reciprocable in the bearing. The sleeve bearing may be formed of hardened steel, tool-steel, or of some softer metal which is interiorly coated with a hard, wear-resisting surface such as chromium-plating or tungsten carbide, but hardened steel is preferred.

The shaft and sleeve bearing are positioned so that one is supported by the other for relative reciprocation, and suitable means are provided for reciprocating either the bearing or the shaft, while the other is held relatively stationary.

It will be understood that the foregoing general description and the following detailed description as well are exemplary and explanatory of the invention but are not restrictive thereof.

Referring now in detail to the typical and illustrative embodiment of the invention, there is provided a shaft member 10 which is supported in end brackets 12 and 14 which are fast on a base 16 and hold the shaft 10 against axial movement. Shaft 10 has mounted on it for reciprocation a work support 18 which is carried by the sleeve bearing 20 fitted to the shaft 10 with proper working clearance between them, so that the sleeve bearing 20 and its supported member 18 may reciprocate on the shaft along substantially the full length thereof. For relatively reciprocating the sleeve bearing 20 and the shaft 10, there is provided a power-driven means which illustratively comprises an air motor having its cylinder 22 securely mounted on bracket 14, while its piston 24 is connected by piston rod 26 to a lug 28 dependent from the sleeve bearing 20, air being alternately supplied to one and then the other of the air inlets 30 on the air cylinder 22. As air is admitted, first to one and then the other of the inlets 30, the piston 24 moves the bearing 20 and its supported load first in one direction and then the other along the shaft 10.

Sleeve bearing 20 is formed as shown with a uniform cylindrical bore and is preferably formed of a good grade of steel which has been hardened and ground and is provided with a good interior finish. In certain instances, it is desirable to form the interior surface of the sleeve bearing from a metal of extreme hardness, such as tungsten carbide, but this is not ordinarily required, and a relatively thick sleeve-like layer of highly finished hardened steel is preferred.

Shaft member 10 is likewise preferably formed of a good grade of steel which has been case-hardened, as at 32, and straightened and is of substantially uniform exterior diameter. Shaft member is then coated with a relatively thin layer of a good bearing metal such as one of the copper-base, lead-based, tin-based or aluminum-based bearing alloys and is thereafter turned, ground or broached to form the finished bearing surface of the shaft which provides a straight, substantially uniform diameter cylindrical surface which is sufficiently rough or porous to have good lubricant retaining properties.

The shaft may be electroplated to provide it with the desired thickness of bearing metal 34, usually from 0.002" to 0.045" and preferably from 0.005" to 0.020" in thickness, and where the shaft is to be electroplated, a layer of brass or babbitt is preferably applied.

Alternatively, the surface layer of bearing metal may be provided on the shaft by dipping the shaft into a molten bath of the bearing alloy, and controlling the temperature and the rate of withdrawal of the shaft from the bath and the rate of cooling so that a layer of the desired thickness is allowed to remain on the surface of the shaft. Among the alloys which are suitable for application by the molten-bath, dipping technique are the following:

Tin base alloys comprising about: tin 89%, lead 0.35%, antimony 7.5% and copper 3.5% or tin 65%, lead 15%, antimony 15%, copper 2.0%.

Lead base alloys comprising about: lead 63.5%, tin 20%, antimony 15% and copper 1.5%; tin 2.0%, antimony 15%, copper 0.2%, lead remainder; tin 2.0%, antimony 15%, copper 0.2%, silver 5.0% and lead remainder.

Aluminum-based bearing alloys comprising about: aluminum 89.5%, tin 6.5%, copper 1%, nickel 1%, silicon 2%, or aluminum 91.5%, tin 6.5%, copper 1% and nickel 1%.

Copper base alloys comprising about: copper about 80%, tin 10%, lead 10%; copper 82%, tin 16% and zinc 2%.

Although the processes described above give excellent shafts for use in the present invention, I prefer the following procedure. I use a shaft which is formed of relatively inexpensive steel, such as SAE1050, or SAE1060, which has been hardened to a hardness of approximately 55 to 65 Rockwell "C" scale, and a depth from 2% to 20% of the shaft diameter.

This procedure gives greatly increased physical properties to the steel at the point where it is most effective, that is, the point furthest from the neutral axis. As in the case of a tube being almost as strong as a solid bar, this produces a shaft of comparable strength to a through hardened shaft and at the same time, permits it to be straightened after heat treatment to remove the warpage which naturally results. This cannot be done to shafts which have been through hardened to the desired hardness. They can only be straightened by grinding away enough material to take out the warpage. This is a very slow and expensive process which frequently fails when the warpage exceeds the grinding stock provided on the shaft.

Another advantage of case hardening is that it can be done in a progressive fixture by induction heating which is rapid and much less expensive than through hardening.

In addition to added strength, the case hardening adds to the corrosion resistance of the finished shaft, particularly if the coating of bearing material is made porous to retain lubricant. It is well known that heat treated steel is much more corrosive resistant than soft steel. This resistance can be further increased if the hardened surface is ground to a fine finish.

This shaft is then provided with a relatively thin, complete coating of sprayed metallic molybdenum which is sprayed so as to form a firm bond with the surface of the steel shaft and to provide a coating having a thickness of from about 0.001" to about 0.003". Thereafter, the surface of the shaft is again sprayed with molten bearing-metal alloy, such as a bearing alloy chosen from the brass, bronze (copper-based) and aluminum-based alloys, preferably a copper-lead-tin bronze, which is applied in accordance with conventional metal-spraying techniques to provide a porous, continuous, firmly adherent and substantially uniform layer of bearing metal on the molybdenum-plated steel shaft, thereby providing the shaft with a lubricant-retentive layer which forms an exceedingly good bearing surface.

The plated shaft, whether plated by electrodeposition, by dipping or by spraying, is then machined, as by turning, broaching or grinding to provide it with a straight cylindrical exterior of substantially uniform diameter, the diameter being appropriate to the size of the bearing with which it is to be used.

The shaft member, and the extent of relative reciprocation of the bearing and shaft are preferably several times the length of the bearing. As the ratio of the shaft length to bearing length is increased, the life of the shaft and bearing combination is increased, due to the increasing area of bearing material on the shaft available to resist wear.

Among the numerous advantages which are presented by the combination of the present invention is the freedom from rust and corrosion, due to the fact that the bearing surface on the shaft presents a rust and corrosion resistant surface where it is exposed to moist atmosphere, while the bearing surface of the sleeve bearing is at all times protected against rust and corrosion since it is an internal surface not exposed to the atmosphere.

The invention in its broader aspects is not limited to the specific mechanisms shown and described but departures may be made therefrom within the scope of the accompanying claims without departing from the principles of the invention and without sacrificing its chief advantages.

What is claimed is:

1. A machine element comprising a steel shaft, said shaft having an outside bearing surface of a thin layer of a porous, lubricant-retaining bearing material bonded to the steel shaft, a bearing for said shaft, said bearing having an inner, shaft contacting bearing surface which is harder than the bearing surface of the shaft, and means for reciprocating the shaft and the bearing relatively to each other with said bonded shaft surface extending throughout the length of said reciprocation whereby the wear of the softer shaft bearing surface is distributed over the surface of the shaft.

2. A machine element comprising a straight steel shaft having an outside bearing surface of a sprayed, porous, lubricant-retaining bearing metal selected from the group consisting of copper-, lead- and aluminum-based bearing alloys, a thin layer of sprayed molybdenum underlying the surface layer and bonding same to the shaft, and a bearing sleeve for said shaft and having an inner, shaft contacting bearing surface of highly finished hardened steel which is harder than the bearing surface of said shaft, the shaft and bearing being relatively reciprocable with respect to each other to distribute the wear over the surface of the shaft rather than in the bearing.

References Cited in the file of this patent

UNITED STATES PATENTS

| | | |
|---|---|---|
| 821,325 | Adams | May 22, 1906 |
| 1,586,562 | Lucey | June 1, 1926 |
| 2,157,762 | Knox | May 9, 1939 |
| 2,588,421 | Shepard | Mar. 11, 1952 |

OTHER REFERENCES

Basic Metallurgy, vol. 1, Grosvenor, page 372, ASM Publication.